Feb. 23, 1932. J. H. MARTIN 1,846,130
FISHING LURE
Filed Aug. 18, 1930
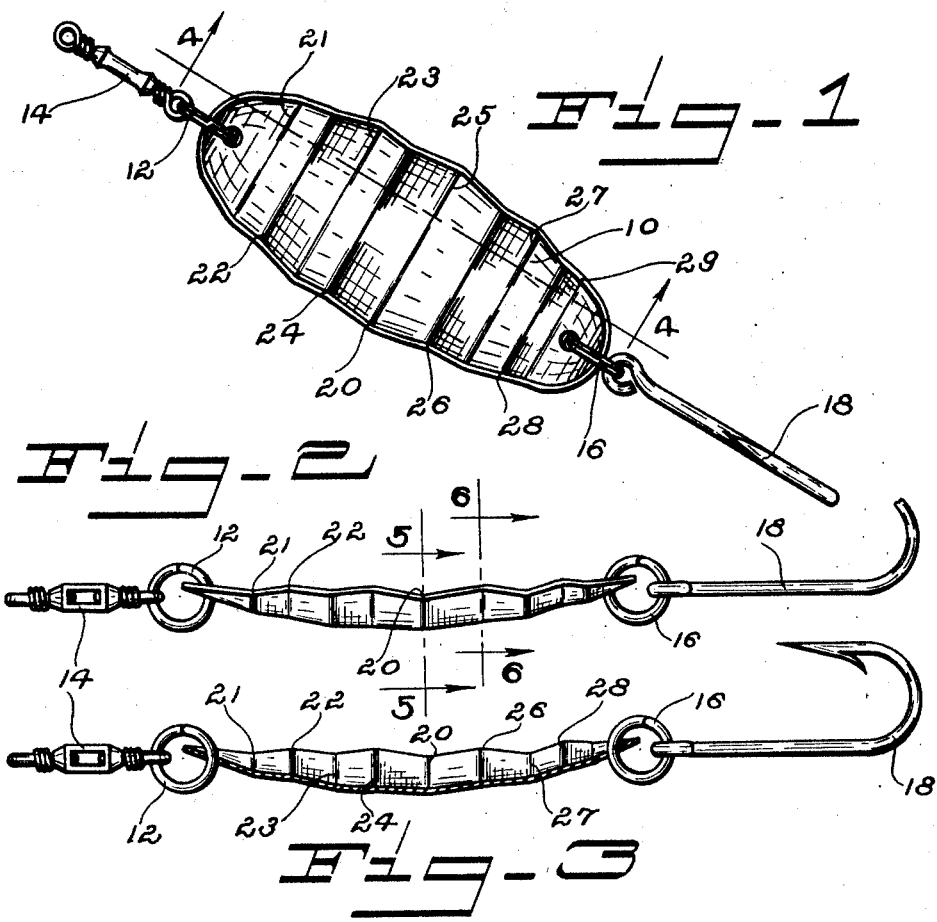
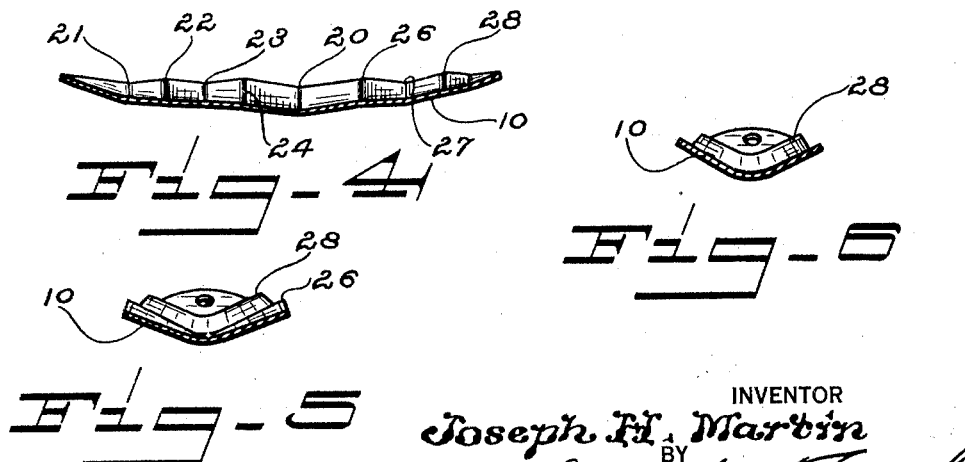
INVENTOR
Joseph H. Martin
BY
Smith + Tuck
ATTORNEYS Patented Feb. 23, 1932

1,846,130

UNITED STATES PATENT OFFICE

JOSEPH H. MARTIN, OF SEATTLE, WASHINGTON

FISHING LURE

Application filed August 18, 1930. Serial No. 475,991.

My present invention relates to the fishing art and more particularly to a fishing lure.

My fishing or trolling lure is of that general class commonly referred to as a spoon because of its shape, and being more specifically defined as a single piece, non-revolving lure. It has been common practice for many years to take a single piece of metal, form it in the general shape of, for instance, a tea-spoon, and secure it at one end to an axis, about which it is free to revolve. To get the best results from this type of spoon it is desirable to have the general contour of the spoon somewhat pointed at one end so that a projection of the spoon will present an egg-shaped appearance.

My present spoon, however, is designed in a manner to prevent its spinning. To accomplish this I form my spoon with an elongated elliptical marginal contour, and concavo-convex cross-sectional form. In this manner the front portion of the spoon and the rear portion are exactly the same. Further I attach my hook to the rear end of the metal body, and thus am able to produce a spoon which, when towed at the proper speed, will rock from side to side and will only occasionally turn over but which will not revolve in the commonly accepted sense. Therefore, The principal object of my invention is to provide a trolling lure which creates the illusion of either a badly injured fish or a considerable mass of food, such as the spawn of various fish.

A further object is to provide a fishing lure which because of its unusual construction provides a large number of light-reflecting surfaces.

A further object is to provide a fishing lure which because of its structural shape provides unusual strength even when made from light weight material.

Other and more specific objects will be apparent from the following description taken in connection with the accompanying drawings, wherein:

Figure 1 is a top plan view of my design.
Figure 2 is an elevation of my spoon.
Figure 3 is a longitudinal sectional view.
Figure 4 is a longitudinal section taken along the line 4—4 of Figure 1.
Figure 5 is a cross-sectional view taken along the line 5—5 of Figure 2.
Figure 6 is a cross-sectional view taken along the line 6—6 of Figure 2.

Referring to the drawings throughout which like reference characters indicate like parts, numeral 10 designates the main body of my spoon. This I normally prefer to form in a metal die. Secured to the front end of the spoon as by ring 12 is any preferred type of swivel 14. I have found that even though my spoon does not spin in the ordinary sense that a swivel must be employed at this point if the spoon is to have that freedom of action which gives it its ability to create the illusion of food. To the rear end of the spoon I secure by a second ring 16 the usual hook 18. As I prefer to form my spoon each end thereof is identical in form, the front and rear end of the spoon being determined merely by the placement of the swivel or hook.

In Figure 1 the general outline of my spoon may be expressed as an elongated ellipse. In the first or blanking operation my spoon has regular curves as a margin and it is only after the flattened light-reflecting surfaces have been impressed therein that the irregular outline is brought out. The longitudinal and transverse sections in the original forming are accurate curves, which when the final forming takes place are slightly deformed in that light-reflecting surfaces are formed so as to merge one into the other and cover the entire spoon. A more definite idea of the spoon's form will be had by a study of the figures. I have formed the surface of my spoon with a transverse axis at 20. On each side of this axis—that is forwardly and rearwardly thereof—I provide a plurality of valleys and ridges as the valleys 21, 23, 25, 27, 29, and the intervening ridges 22, 24, 26, 28. I have found that it is very desirable to have the same number of valleys and ridges on each side of the transverse axis. In this manner the water impinging upon any of the flat surfaces has a contra-action on the other end of the spoon and in this manner no definite spinning action is given to my spoon.

I have found that this spoon is particularly adapted under fishing conditions where the principal food of the fish sought is the spawn of other fish or seafood. My spoon particularly creates the illusion of shrimp spawn. Shrimps, of course, are a seafood, which attain sizes up to three inches over all, and their spawn consists of a sort of frothy, jelly-like mass, in which the baby shrimps develop. When viewed in the water the appearance given is that of a translucent white mass, approximately the size of a hen egg, and the baby shrimps appear therein as little spots of deeper color, being greenish or brownish, sometimes slightly tinged with red.

My spoon, with its large number of light-reflecting surfaces, when drawn through the water creates the illusion of a mass of this shrimp spawn as it is washed about by the currents. As a result of this similarity of appearance I have found my wobbling spoon is a particularly effective lure at certain seasons of the year.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

What I claim is:

1. A fishing lure having an elongated elliptical marginal contour; a concavo-convex cross-sectional form and a plurality of alternately disposed transverse ridges and valleys.

2. A fishing lure having an elongated elliptical marginal contour; a concavo-convex cross sectional form; a plurality of alternately disposed transverse ridges and valleys; line attaching means at the forward end of said lure and a hook secured to the rear end of said lure.

3. A spoon shaped fishing lure formed of a single piece of material, having a concavo-convex cross sectional form and a plurality of alternately disposed transverse ridges and valleys.

In witness whereof I have hereunto subscribed my name this 29th day of July, A. D. 1930.

JOSEPH H. MARTIN.